United States Patent [19]

Schwemin

[11] Patent Number: 5,148,313
[45] Date of Patent: Sep. 15, 1992

[54] STABILIZER CELL FOR INERTIAL OPTICAL STABILIZER

[76] Inventor: Arnold J. Schwemin, P.O. Box 1005, Twain Harte, Calif. 95383

[21] Appl. No.: 730,369

[22] Filed: Jul. 16, 1991

[51] Int. Cl.$^5$ .............................................. G02B 27/64
[52] U.S. Cl. ...................................... 359/555; 359/196
[58] Field of Search ............... 359/554, 555, 871, 412, 359/196, 223; 356/148

[56] References Cited

U.S. PATENT DOCUMENTS

| | | | |
|---|---|---|---|
| 3,677,618 | 7/1972 | Schwemin | 359/412 |
| 3,892,467 | 7/1975 | Shin | 359/557 |
| 3,964,817 | 6/1976 | Humphrey | 359/557 |
| 4,911,541 | 3/1990 | Alvarez et al. | 359/557 |

Primary Examiner—Bruce Y. Arnold
Assistant Examiner—James Phan
Attorney, Agent, or Firm—Townsend and Townsend

[57] ABSTRACT

An improved stabilizer cell for an optical instrument is disclosed. A mirror assembly is mounted to and pivoted for torsional movement only about orthogonally disposed wires under high tension. The mirror assembly includes a mirror, a counter weight, and a support point at the neutral inertial axis there between. The counter weight is conductive and non magnetic and given a spherical shape relative to the mirror assembly support point. This counter weight moves within a mechanically adjustable magnetic field for adjustable damping of stabilizer motion. Suspension of the mirror assembly relative to the support point occurs by a first wire having a high modulus of elasticity (preferably tungsten) and placed under high tension. This wire is mounted at right angles to the optical axis of the stabilizer within an assembly support tube and supported in high tension from both distal ends of the assembly support tube. The assembly support tube itself is mounted for torsional movement only about a second wire under high tension, this wire passing orthogonally to both the axis of the stabilizer and the axis of the first wire. The high tension wires are each passed through narrow passageways within the stabilizer so that movement of the mirror assembly about the support point relative to the wire is practicable under the forces of wire torsion only. Each wire has a fixed end and an adjustable end so that torsional adjustment of the mirror assembly to the neutral axis of the stabilizer can occur at any time. In operation, space referenced stabilizing motion of the mirror occurs with adjustable damping resulting in an improved stabilized view through optical instruments employing the improved cell.

3 Claims, 4 Drawing Sheets

STABILIZER CELL FOR INERTIAL OPTICAL STABILIZER

This invention relates to optical stabilizers of type utilized to stabilize optical view through magnified optical instruments against frequencies of vibration that cause corresponding magnified image motion an consequently interfere with view. More particularly, a mirror is supported in two degrees of motion along orthogonal axes for torsional motion only with respect to an instrument optical axis. Support of the mirror occurs by paired wires under high tension for torsional movement only about the suspending wire. When damping is applied by a counter weight subjected to eddy current forces in a magnetic field, inertial stabilization results.

BACKGROUND OF THE INVENTION

In my U.S. Pat. No. 3,677,618 issued Jul. 18, 1972 entitled Binoculars Having Stabilizing Reflectors, I disclosed an optical instrument having a single objective input, paired binocular outputs at attached eye pieces, and a folded light path therebetween. With respect to the objective lens, a stabilizer cell having a mirror was positioned to cause one of the folds in the light path at approximately one half the focal length of the objective.

The stabilizer cell utilized is described in Humphrey U.S. Pat. No. 3,711,178 Issued Jan. 16, 1973, entitled Mirror Stabilizer Having Space Reference Motion. The construction and function of this device can be briefly set forth.

A stabilizer cell of cylindrical configuration confining a transparent fluid bath was utilized. A circular mirror was placed within the cell and suspended on a rubber band extending longitudinally of the chamber and at least partially buoyantly supported by the transparent fluid. The mirror faced a circular transparent wall of the stabilizer cylinder and reflected light incident to the mirror through the transparent wall from the mirror out through the transparent wall.

Operation of the stabilizer is easy to understand. When the stabilizer cell under goes motion, the confined fluid within the stabilizer cell likewise under goes motion. The mirror under force of the fluid motion of the transparent fluid in the stabilizer moves with respect to the stabilizer in inertial stabilized motion with respect to space. At the same time, the rubber band biasing the mirror provided a restoring force. The mirror tended to return to a neutral position with respect to the optical instrument being stabilized. There resulted a relatively satisfactory scheme for optical stabilization.

This type of stabilizer does have its drawbacks. Specifically, the transparent wall of the chamber in combination with the transparent fluid and the optical interfaces associated with the window degraded the optical quality of the stabilizer. This degraded optical quality was magnified by the power of the instrument. Further, and since the mirror was suspended in a fluid tight environment, user adjustment of the mirror suspension in the field was not practicable.

SUMMARY OF THE INVENTION

An improved stabilizer cell for an optical instrument is disclosed. A mirror assembly is mounted to and pivoted for torsional movement only about orthogonally disposed wires under high tension. The mirror assembly includes a mirror, a counter weight, and a support point at the neutral inertial axis there between. The counter weight is conductive and non magnetic and given a spherical shape relative to the mirror assembly support point. This counter weight moves within a mechanically adjustable magnetic field for adjustable damping of stabilizer motion. Suspension of the mirror assembly relative to the support point occurs by a first wire having a high modulus of elasticity (preferably tungsten) and placed under high tension. This wire is mounted at right angles to the optical axis of the stabilizer within an assembly support tube and supported in high tension from both distal ends of the assembly support tube. The assembly support tube itself is mounted for torsional movement only about a second wire under high tension, this wire passing orthogonally to both the axis of the stabilizer and the axis of the first wire. The high tension wires are each passed through narrow passageways within the stabilizer so that movement of the mirror assembly about the support point relative to the wire is practicable under the forces of wire torsion only. Each wire has a fixed end and an adjustable end so that torsional adjustment of the mirror assembly to the neutral axis of the stabilizer can occur at any time. In operation, space referenced stabilizing motion of the mirror occurs with adjustable damping resulting in an improved stabilized view through optical instruments employing the improved cell.

DESCRIPTION OF THE PREFERRED EMBODIMENT

Figure 1:
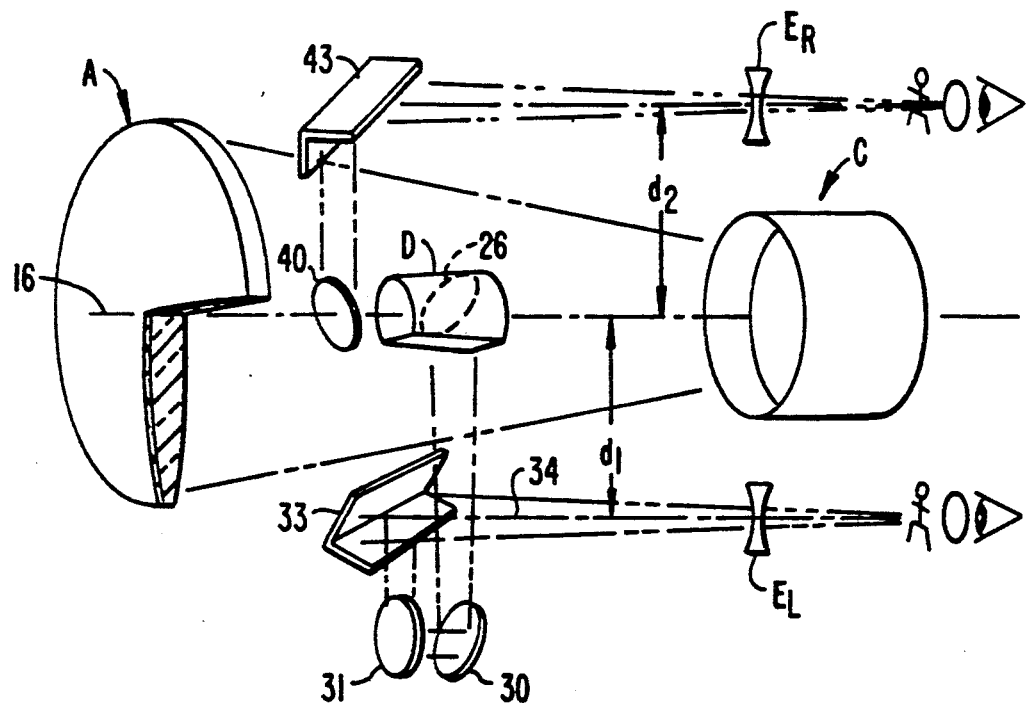
FIG. 1 is a schematic perspective view of the optical train described in my U.S. Pat. No. 3,677,618 entitled Binoculars Having Stabilizing Reflectors with the cell of this invention substituted in place of the originally specified fluid mounted and biased cell.

Referring to FIG. 1, an objective A is shown symmetrically placed about an optical axis 16. Light from an infinite object, here an image of a stick figured man (not shown) enters objective A along optical axis 16 and converges on a mirror M at cell C. From mirror M and cell C, the light reconverges to a first optical path to eyepiece EL and a second optical path to eyepiece ER.

The overall optical instrument is known. Specifically, it is shown in my Schwemin U.S. Pat. No. 3,677,618 of Jul. 18, 1972 entitled BINOCULARS HAVING STABILIZING REFLECTORS. Since the eyepath there disclosed constitutes the preferred embodiment of my invention, that patent is incorporated to this application by reference.

Continuing on with the description, light from mirror M converges to a beam splitting prism D. Beam splitting prism D along plane 26 through window 24 reflects outwardly the left eyepath. The left eyepath impinges on mirrors 30, 31 and thereafter to roof mirror 33. Finally, passage along axis 34 through eyepiece EL and into the eye H of a viewer occurs. For simplicity, the stick figured person observed by the instrument is shown immediately in front of eye H.

The right optical train is analogous. Specifically, light passes through beam splitter D at plane 26 to mirror 40, and then to roof mirror 43. The light is directed to an eyepiece ER and then to the right eye of the viewer.

In order to enable the standard inter-ocular separation, eyepieces ER and EL can be understood to be rotatable about optical axis 16 by apparatus not shown. Consequently the distances D1, D2 of the eyepieces from the optical axis are the same.

It is important to note that mirror M is approximately one-half the focal length of the objective 16 from the objective 16. Thus, presuming that this stabilizer is referenced with respect to space, it will be understood from discussions replete in the prior art that during accidental angular motion, mirror M will cause any vibrations imparted to the images of the viewer to be canceled.

As a practical matter, the disclosed optics are in the range of 20 power. It is the function of the stabilizer of this invention to effect stabilization of the image.

Figure 2:
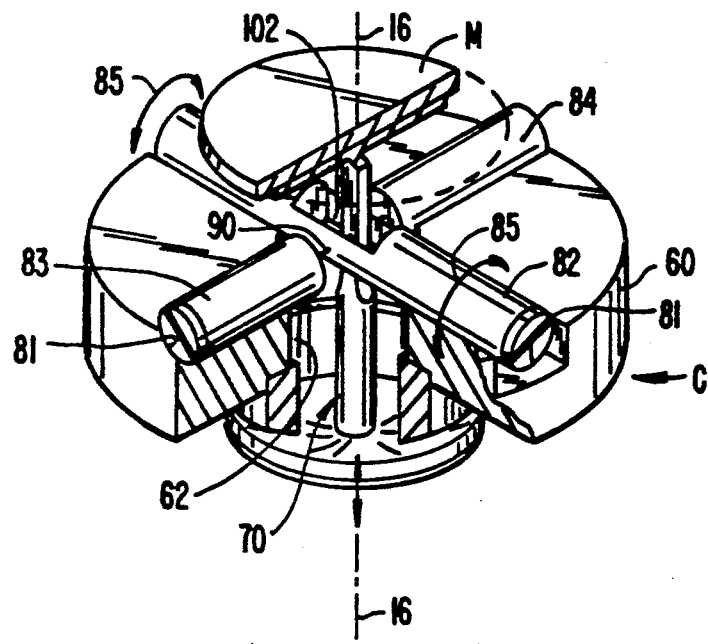
FIG. 2 is a perspective view of the improved stabilizer cell of this invention schematically illustrating a supporting cell and illustrating on the view the axis of the stabilizer together with the crossed orthogonally disposed wires for the torsional support of the stabilizing mirror.

Referring to FIG. 2, an exploded and broken-away view of the stabilizer cell C and the mirror M is shown relative to an optical axis 16.

Typically, the stabilizer cell includes a solid block 60, cylindrical in format. This block has its cylindrical axis generally aligned with the optical axis 16. Block 60 includes a central bore, 62. It is through this central bore that a mirror assembly 70 is mounted. The reader will understand that in the view shown in FIG. 2, mirror M of mirror assembly 70 has been exploded above its normal position with respect to the cell C. This has been done so that the reader can understand the suspension of the apparatus here illustrated.

Returning to the description of cylindrical block 60, cylindrical block 60 includes two U-shaped channels. There is a first large U-shaped channel 81. It is the function of channel 81 to allow freedom of movement of mirror assembly support 82, in limited pivotal movement (see arrows 85) about a first orthogonal wire 90.

Cylinder cell C includes a second, and smaller U-shaped channel 81. Into the smaller U-shaped channel 81 are placed wire mounting cylinders 83 and 84. These cylinders mount wire 90 in tension, and enable the support of mirror assembly support 82 within its larger channel 81.

Figure 3:
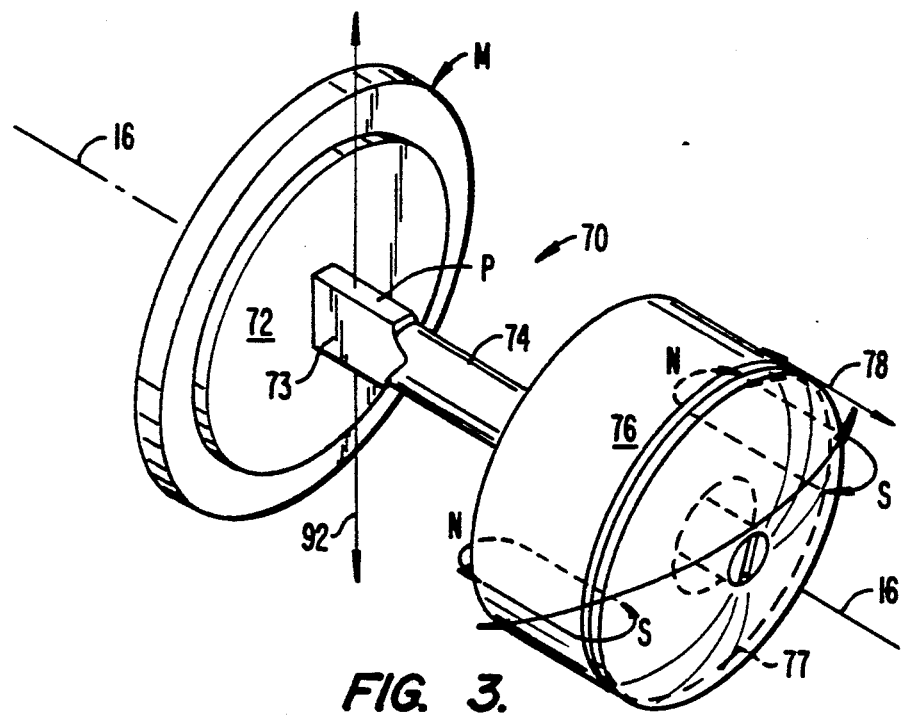
FIG. 3 is a schematic of the mirror assembly including the mirror, the counter weight, and the support point there between—the counter weight here being shown between adjustable permanent magnets of high strength for providing adjustable damping to the stabilizer.

The mirror assembly can be understood with reference to FIG. 3. The mirror assembly includes a mirror M placed on a mount 72. Mount 72 is in turn mounted at a block 73, which tapers to a shaft 74. Shaft 74 extends along optical axis 16, away from mirror M and backing 72 to a counterweight 76.

Block 73 forms a support point P for the mirror assembly 70. This support point P is the point at which a wire 92 torsionally supports mirror assembly 70. This torsional support is at the inertial center of the system.

As in all stabilizers of this type, some damping is required. Damping is here provided by a circular magnet 77 having towards an away motion along vector 78 with respect to counterweight 76.

Counterweight 76, typically aluminum, has three important characteristics.

First, it is generally spherical, having the center of the sphere defined about support point P. Secondly, the material of the counterweight 76 and all portions of the assembly 70 which can come under the influence of the circular magnet 77 are non-magnetic.

Finally, the material of 76 is conductive.

Circular magnet 77 is generally a high strength magnet of iron cobalt neodymium which produces very strong fields. The interaction of these fields with the counterweight 76 is well understood and will only be briefly summarized here. Specifically, the magnetic field from magnet 77 sets up eddy current within the metal of counterweight 76. These eddy currents produce magnetic fields equal and opposite to the fields of the magnet 77. Damping of any motion produced results.

The magnet 77 is adjustable towards and away from the counterweight 76 in the direction 78. Thus the intensity of the magnetic field can be easily adjustable for desired correction of the magnetic damping forces.

Having set forth the construction of the mirror assembly 70, the suspension of the mirror assembly 70 from the mirror assembly support 82 can now be understood.

Mirror assembly support 82 includes a cylinder 100 having a narrow bore 102 along the axis of the cylinder. At one end of bore 102, there is a fixed plug 104 having a tungsten wire 92 affixed thereto.

Exemplary dimensions can be instructive. Typically, bore 102 is in the order of 5 to 6 mils. Wire 92 is typically a 2 to 4 mil tungsten wire. Preferably, tungsten wire 92 is stretched over two inches and under tension in the order of about four pounds. The suspended mirror assembly M is in the order of one-half ounce. As wire 92 has a breaking strength in excess of about 40 pounds (4 mil wire), it will be appreciated that the cell assembly is sturdy, being able to withstand forces up to approximately 600 gravities resulting from dynamic shock imparted to the instrument. Wire 92 is rotationally affixed to plug 104. Likewise, wire 92 is rotationally fixed at point P to mirror assembly 70. The wire extends, and is again rotationally fixed to a rotatable plug 106 at the distal end of mirror support 82.

Plug 106 is rotatable with respect to cylinder 100. By having this rotation, plug 106 enables the neutral and biased position of the mirror M to be adjusted relative to the optical axis 16 as seen in FIG. 4.

Figure 4:
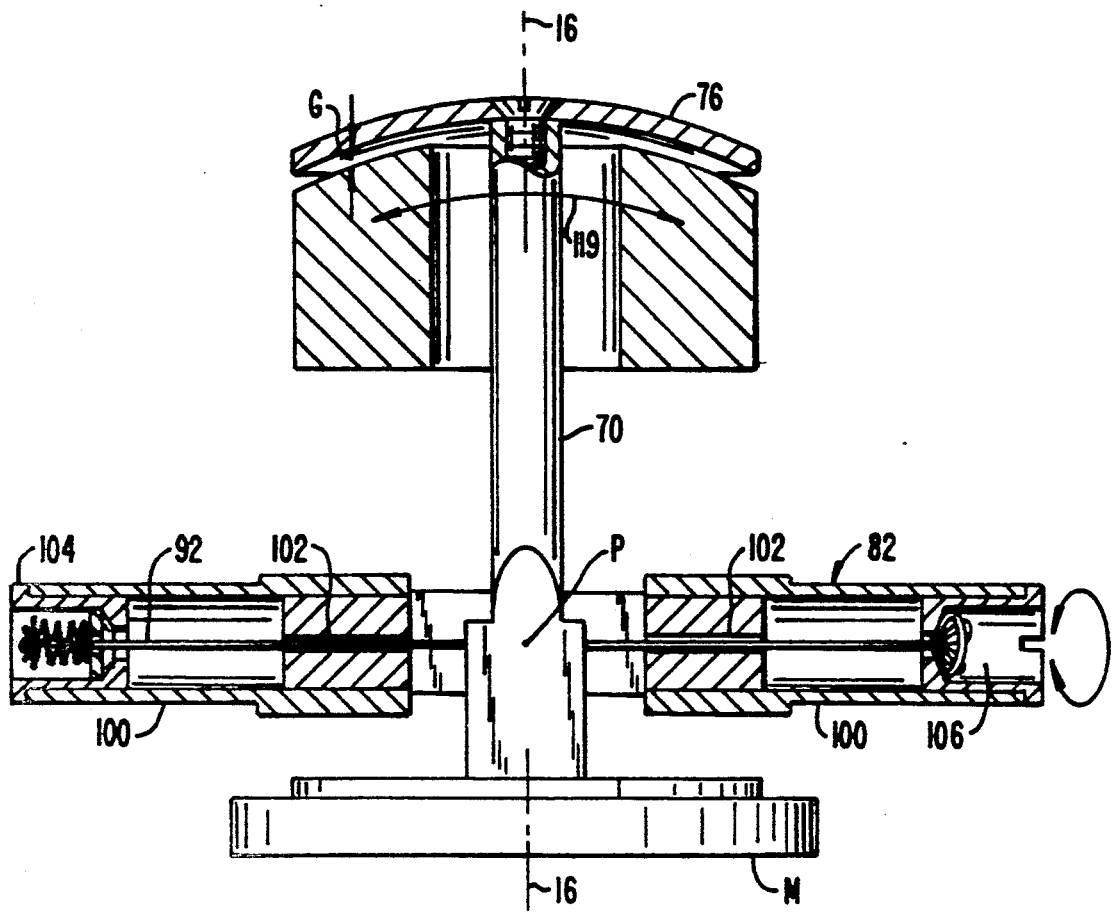
FIG. 4 is a view of the mirror assembly support tube in section showing the supported mirror assembly torsionally supported relative to a first high tension wire in the mirror assembly support tube; and, FIG. 5 is a view of the cell illustrating the orthogonal support of the mirror assembly support tube from the second high tension wire suspended from the cell assembly; and, FIG. 6 is a graphical representation of the frequency response of an experimental model constructed according to the stabilizer cell disclosed herein.
Figure 5:
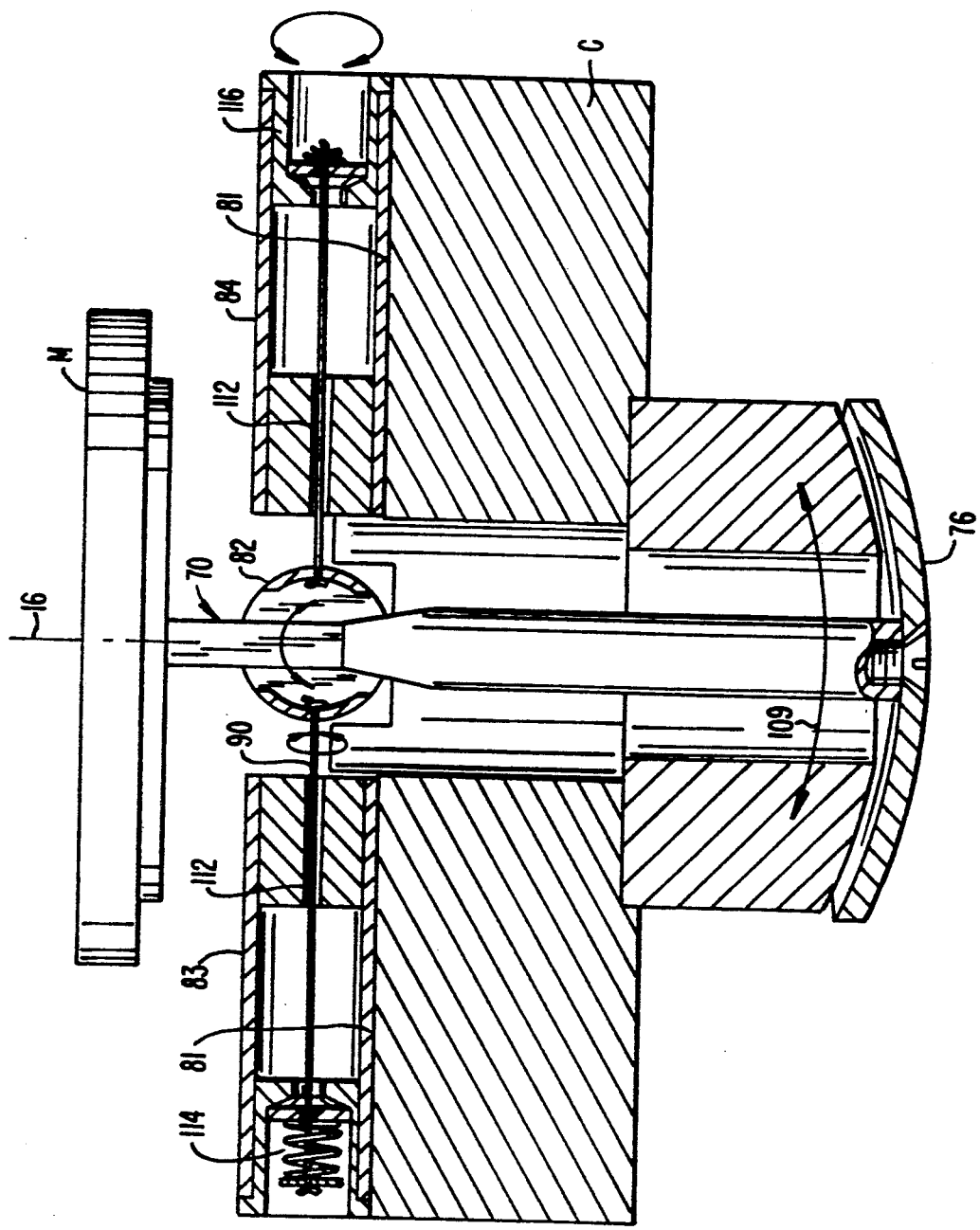

It is important to understand that the degree of pivot allowed by the support shown in FIG. 4 is movement in the direction of arrow 109 shown in FIG. 5.

Having set forth the attachment of the mirror assembly 70 to the mirror support 82, the attachment of the mirror support 82 to the cell C can be thus understood with respect to FIG. 5.

Turning to FIG. 5, cell C is only partially shown. Mirror assembly is shown disposing mirror M normal to optical axis 16.

Paired cylinders 83, 84 fit within small U-shaped segment 81. These respective cylinders have respective 4 to 5 mil narrow bores 112 about a 4 mil tungsten wire 90. As before, wire 90 is fixed at end 114 at cylinder 83, and fixed at a rotatable plug 116. Wire 90 attaches on opposite sides to mirror support 82, and again is under approximately 4 pounds of tension. When the mirror assembly 70 moves in torsion, motion occurs in the direction of arrow 119 as shown in FIG. 4 of the mirror assembly 70.

It will be noted that the bores 102, 112 constrain the wires 92, 90 from substantially any motion except torsional motion. Further, since the wires are under relatively high tension (remember that a 4 mil wire is under about 4 pounds of tension) movement of the mirror assembly 70 about each of the respective wire attachments is practicable in torsion only. Further, and remembering that tungsten wire has an extremely high modulus of elasticity, it will be appreciated that the wires 90, 92 do not stretch to any significant degree. I use the same tension in both wires 90, 92. Although the mirror support 82 adds additional weight, I find that this weight is not significant in the desired stabilization.

I use the term "wire under high tension". It will be realized that a 4 mil wire under the disclosed 4 pounds of tension has 17,500 pounds per sq. in. tension exerted on it. This tension, coupled with the disclosed quarter-ounce weight of the stabilizer, causes torsional movement only to occur under the torsional spring bias from the disclosed wires.

Figure 6:
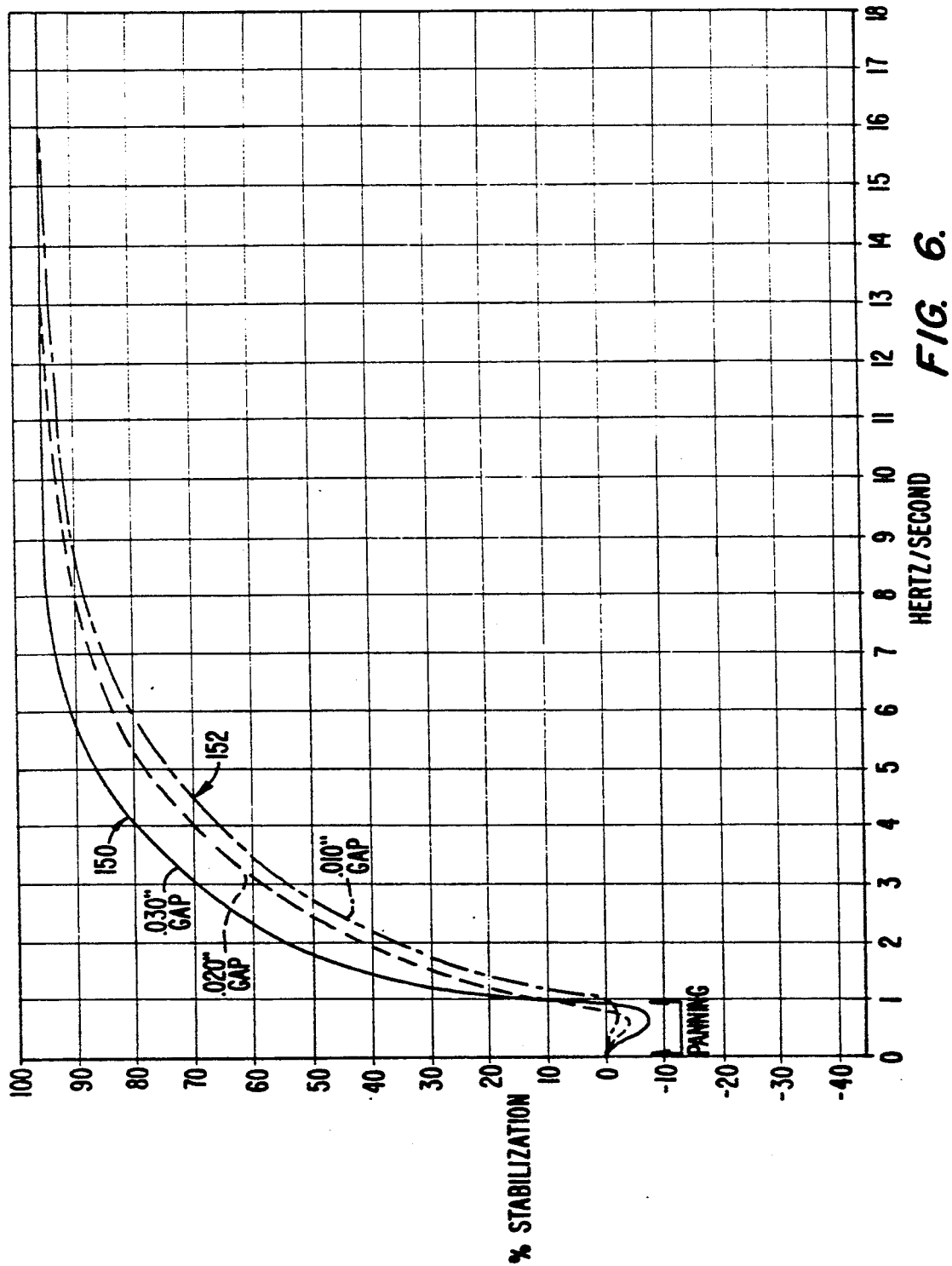

The reader will understand that I have constructed an actual model of this stabilizer, and tested its response. Referring to FIG. 6, vibration of Hz/sec. is plotted relative to percent stabilization.

With no magnetic force present the mechanical resonance of the (torsion spring/mass) is adjusted to approximately 0.7 Hz/sec. The "Q" or figure of merit of the resonant system is above 500.

Assuming a tight couple (0.010") gap between magnet 77 and counterweight 76, stabilization along curve 152 will occur. Simply set forth, at rates of vibration above 1 Hz, stabilization percentage will increase until at approximately 4 Hz it will be on the order of 65% and at 8 Hz over 90%.

With loose coupling between the magnet 77 and the counterweight 76, stabilization along curve 150 will result with more stabilization at the lower frequency end of the curve.

I prefer a relatively loose couple of the stabilizer as set forth in curve 150 over curve 152. Note the curves measured were for emulated hand tremor from zero to 16 Hz/sec, with an excursion of ±3½. This was conducted on a shake table.

The reader will understand that this invention will admit of modification. For example, supports of varying configurations can be utilized so long as torsional stabilization under high tension wire occurs.

What is claimed is:

1. An improved stabilizer cell for an optical instrument for acting with an optical train affixed to said instrument for stabilizing an image relative to said instrument upon accidental angular motion of said instrument, said stabilizer cell comprising:

a stabilizer cell body;

a mirror assembly including a mirror, a counter weight, and a support point at the neutral inertial axis there between;

said counter weight being conductive and non magnetic and given a spherical shape relative to the mirror assembly support point;

an adjustable magnetic field mounted to said cell in the path of motion of said counter weight for adjustable damping of said mirror assembly motion;

a mirror assembly support having first and second distal ends and a mirror assembly support interval there between for permitting relative movement of said mirror assembly mounted at said support point within said mirror assembly support interval;

a first wire mounted to said mirror assembly support at both distal ends and placed under high tension, said first wire connected to said mirror assembly at said support point at a position between said distal ends and disposed at substantial right angles to the optical axis of the stabilizer from said mirror assembly support for torsional movement only of said mirror assembly with respect to said mirror assembly support at said mirror assembly support interval;

a second wire mounted to said stabilizer cell body at both distal ends and placed under high tension, said second wire connected to said mirror assembly support and connected substantially orthogonally to the optical axis of the stabilizer and said first wire for torsional movement only of said mirror support assembly with respect to said stabilizer cell body whereby said mirror can undergo spaced reference stabilizing motion upon motion of said optical instrument.

2. The invention of claim 1 and wherein each said high tension wires passes through narrow passageways within said mirror support assembly and said stabilizer cell body to confined relative motion with respect to said high tension wire in torsion only.

3. The invention of claim 1 and wherein each wire has a rotationally fixed end and a rotationally adjustable end so that torsional adjustment of the mirror assembly can occur relative to the neutral axis of the stabilizer.

* * * * *